(12) United States Patent
Miller et al.

(10) Patent No.: US 8,141,918 B2
(45) Date of Patent: Mar. 27, 2012

(54) PEDESTRIAN BUMPER SYSTEM AND METHOD

(75) Inventors: Ryan Miller, Columbus, OH (US); Hirohide Ikeno, Rancho Palos Verdes, CA (US); Yoshikatsu Takeuchi, Tochigi (JP); Takayuki Sugama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/276,322

(22) Filed: Feb. 24, 2006

(65) Prior Publication Data

US 2007/0200373 A1    Aug. 30, 2007

(51) Int. Cl.
B60R 19/44    (2006.01)

(52) U.S. Cl. ........................................ 293/143

(58) Field of Classification Search ............. 296/187.04; 293/142, 143
See application file for complete search history.

(56) References Cited

U.S. PATENT DOCUMENTS

| | | | |
|---|---|---|---|
| 1,486,660 A | | 3/1924 | Hajdu |
| 1,704,768 A | | 3/1929 | Sigman |
| 3,378,296 A | | 4/1968 | Crocker |
| 3,610,609 A | * | 10/1971 | Sobel ............................. 293/1 |
| 3,680,903 A | | 8/1972 | Hulten |
| 3,715,138 A | | 2/1973 | Finkle |
| 3,869,164 A | * | 3/1975 | Schwenk ...................... 293/134 |
| 3,884,516 A | * | 5/1975 | Gallion et al. ............. 296/180.1 |
| 3,917,332 A | * | 11/1975 | Puleo ....................... 296/187.02 |
| 3,992,047 A | * | 11/1976 | Barenyi et al. ................ 293/135 |
| 4,015,870 A | * | 4/1977 | Stcherbatcheff et al. ....... 293/32 |
| 4,076,295 A | | 2/1978 | Gutman |
| 4,128,195 A | | 12/1978 | Collins |
| 4,148,505 A | * | 4/1979 | Jensen et al. .................. 280/784 |
| 4,379,582 A | * | 4/1983 | Miwa .......................... 296/180.5 |
| 4,437,696 A | | 3/1984 | Straub |
| 4,582,351 A | | 4/1986 | Edwards |

(Continued)

FOREIGN PATENT DOCUMENTS

DE    10222535    12/2003

(Continued)

OTHER PUBLICATIONS

International Search Report and Written Opinion of the International Searching Authority for PCT Patent App. No. PCT/US07/62717 (Nov. 19, 2007).

(Continued)

*Primary Examiner* — Kiran B. Patel
(74) *Attorney, Agent, or Firm* — Kenealy Vaidya LLP; Mark E. Duell

(57) ABSTRACT

A pedestrian bumper system and method can include an attachment bumper and an attachment bracket for connecting the attachment bumper to the existing vehicle bumper or existing vehicle frame. The attachment bumper can be configured to conform to the existing vehicle bumper such that the frontal crash mode of the vehicle is substantially unchanged. In addition, the attachment bumper can create a new front surface area that includes an area that is lower than the front area of the existing vehicle bumper. Thus, the bumper system can be configured to contact a pedestrian at a lower location to minimize injury during an accident. The bumper system can also be configured to be easily adapted to existing vehicles by either the consumer or the vehicle manufacturer to take advantage of easily modifying vehicles for different market and/or consumer requirements and tastes.

10 Claims, 7 Drawing Sheets

U.S. PATENT DOCUMENTS

| | | | | |
|---|---|---|---|---|
| 4,620,609 | A | 11/1986 | Elsten | |
| 4,826,226 | A * | 5/1989 | Klie et al. | 293/120 |
| 5,350,029 | A | 9/1994 | Figueroa | |
| 6,428,065 | B2 | 8/2002 | Sato et al. | |
| 6,447,049 | B1 * | 9/2002 | Tohda et al. | 296/187.04 |
| 6,510,914 | B2 * | 1/2003 | Ishizaki et al. | 180/274 |
| 6,513,843 | B1 * | 2/2003 | Frederick et al. | 293/120 |
| 6,540,275 | B1 | 4/2003 | Iwamoto et al. | |
| 6,572,086 | B2 | 6/2003 | Kelly | |
| 6,637,790 | B2 | 10/2003 | Bio | |
| 6,652,011 | B1 | 11/2003 | Khan | |
| 6,663,151 | B2 * | 12/2003 | Mansoor et al. | 293/120 |
| 6,672,652 | B2 | 1/2004 | Takeuchi et al. | |
| 6,685,243 | B1 | 2/2004 | Evans | |
| 6,739,634 | B1 | 5/2004 | Pagan | |
| 6,802,556 | B2 * | 10/2004 | Mattsson et al. | 296/187.09 |
| 6,866,313 | B2 * | 3/2005 | Mooijman et al. | 293/120 |
| 6,945,348 | B2 * | 9/2005 | Henderson et al. | 180/271 |
| 6,983,964 | B2 | 1/2006 | Murata et al. | |
| 7,036,844 | B2 * | 5/2006 | Hammer et al. | 280/730.1 |
| 7,097,222 | B2 * | 8/2006 | Ran | 293/137 |
| 7,143,856 | B2 * | 12/2006 | Takahashi et al. | 180/271 |
| 7,159,911 | B2 * | 1/2007 | Nguyen et al. | 293/102 |
| 7,185,728 | B2 * | 3/2007 | Makita et al. | 180/274 |
| 2004/0124667 | A1 | 7/2004 | Bosma et al. | |
| 2004/0160071 | A1 | 8/2004 | Suganuma et al. | |
| 2004/0217605 | A1 * | 11/2004 | Banry et al. | 296/187.04 |
| 2005/0200139 | A1 * | 9/2005 | Suzuki | 293/117 |
| 2005/0269805 | A1 * | 12/2005 | Kalliske et al. | 280/730.1 |
| 2006/0145491 | A1 * | 7/2006 | Shuler et al. | 293/120 |
| 2006/0261611 | A1 * | 11/2006 | Mohapatra et al. | 293/107 |

FOREIGN PATENT DOCUMENTS

| | | |
|---|---|---|
| DE | 102 40 269 | 3/2004 |
| DE | 10 2004 023 134 | 12/2005 |
| JP | 60042138 | 3/1985 |
| JP | 2001-1852 A | 1/2001 |

OTHER PUBLICATIONS

European Office Action for EP Patent Application No. 07 757 411.9 dated Aug. 16, 2011.

Supplementary European Search Report from European Patent App. No. 07 757 411.9 (Feb. 5, 2009).

\* cited by examiner

PEDESTRIAN BUMPER SYSTEM AND METHOD

BACKGROUND OF THE INVENTION

1. Field of the Invention

The invention relates to a vehicle bumper system and method for modifying an existing bumper. More particularly, the invention relates to a vehicle bumper system in which an attachment bumper can be attached adjacent to or directly on an existing vehicle bumper such that the resulting bumper system provides improved safety, aesthetic or performance characteristics and enables the vehicle to be easily adjustable for different markets, aesthetics, performance or safety standards.

2. Brief Description of the Related Art

Several devices are conventionally known that attach to an existing vehicle bumper for protecting the existing vehicle bumper or for allowing the vehicle to accomplish a specific task, such as pushing or towing another vehicle. Many of these devices are add-on type after market accessories, such as spoilers, added bumper pads, etc.

One such bumper pad device is disclosed in U.S. Pat. No. 3,378,296, granted to Crocker, which describes and illustrates vehicle bumper impact absorbers that attach to the front face of an existing vehicle bumper with clamps and hook bolts. The bumper impact absorbers are designed to provide greater safety for the passenger and greater protection against vehicle damage. It is recommended that the length of the bumper impact absorber be very limited and that multiple bumper impact absorbers be placed along the length of the existing vehicle bumper.

U.S. Pat. No. 6,652,011, granted to Khan, describes and illustrates a metallic bumper cover that can be closely-fit over an existing polymeric vehicle bumper. According to Khan, the bumper cover is formed of chromed steel to provide an accentuated "retro" styling for a vehicle, and is configured to closely match the shape of the existing bumper.

Automobile and vehicle designers have also incorporated pedestrian protection features into existing vehicle bumper design. However, many of the different sales markets have different and varying requirements for vehicle bumpers. One particular design for a vehicle bumper may be appropriate and safe for a particular market segment or country, while being disfavored or against regulation in another segment, municipality or country.

SUMMARY OF THE INVENTION

According to an aspect of the invention, a pedestrian vehicle bumper system (for attaching to an existing vehicle that includes an existing bumper and an existing frame structure) can include an attachment bumper structure having a length extending along a longitudinal axis of the attachment bumper structure, a height extending substantially normal to the length and between a top portion of the attachment bumper structure and a bottom portion of the attachment bumper structure, and a depth extending substantially normal to both the length and the height and between an inner portion of the attachment bumper structure and an outer portion of the attachment bumper structure. The attachment structure can be located adjacent the inner portion of the attachment bumper structure and configured to connect to one of the existing bumper and the existing frame structure of the existing vehicle. The existing bumper can have an existing length extending along an existing longitudinal axis of the existing bumper, and the length of the attachment bumper structure can be substantially the same as the existing length of the existing bumper. The existing bumper can have an existing height that is normal to the existing length, and can extend between an existing top portion and an existing bottom portion of the existing bumper, and the attachment bumper structure can extend a substantial distance from the existing bottom portion of the existing bumper when attached to the existing bumper such that a contact point for the bumper system relative to a pedestrian is lowered by the attachment of the attachment bumper structure to the existing bumper.

According to another aspect of the invention, the attachment structure can extend from the bottom portion of the attachment bumper structure and include at least a bolt, a clip, a rivet, a weld, and/or an adhesive for attachment to either the existing bumper or the existing frame structure.

According to another aspect of the invention, the bottom portion of the attachment bumper structure can extend in an inward depthwise direction to mate with the existing bumper while also extending downward relative to the existing bumper.

According to another aspect of the invention, the bottom portion of the attachment bumper structure can extend a first downward distance from the existing bumper that is substantially equal to 20% of the height of the existing bumper.

According to another aspect of the invention, a bumper top attachment can be located adjacent the top portion of the attachment bumper structure such that it can contact the existing bumper structure.

According to another aspect of the invention, the bumper top attachment can be formed of a material that is more flexible then the attachment bumper structure, such that the bumper top attachment can conform to the surface and shape of the existing bumper structure.

According to another aspect of the invention, the attachment bumper structure does not substantially change a frontal crash mode for the existing vehicle when attached to the existing vehicle.

According to another aspect of the invention, a first contact area can be defined by an area between a top of the existing vehicle bumper and a bottom of the existing vehicle bumper, and a second contact area can be defined by a second area between the top portion of the attachment bumper structure and the bottom portion of the attachment bumper structure. The second contact area can be lower than the first contact area.

According to another aspect of the invention, the second contact area can be larger than the first contact area.

According to another aspect of the invention, a pedestrian vehicle bumper system for attaching to an existing vehicle (wherein the existing vehicle includes an existing bumper having a front surface, and an existing frame structure) can include an attachment bumper structure having a length extending along a longitudinal axis of the attachment bumper structure, a height extending substantially normal to the length and between a top portion of the attachment bumper structure and a bottom portion of the attachment bumper structure, and a depth extending substantially normal to both the length and the height and between an outer portion of the attachment bumper structure and an inner portion of the attachment bumper structure. The attachment structure can be located adjacent the inner portion of the attachment bumper structure and configured to connect to one of the existing bumper and the existing frame structure of the existing vehicle. The existing bumper can have an existing length located along a longitudinal axis of the existing bumper, and a height that is normal to the existing length. The front surface can extend in height between an existing top portion and an existing bottom portion of the existing bumper. The attachment bumper structure can be located along a substantial portion of the front surface of the existing bumper and extend a distance from the existing bottom portion to create an additional contact surface that extends in a direction that is either substantially co-planar with or extends frontwards from the front surface of the existing bumper. Thus, a contact point for the bumper system relative to a pedestrian can be either lowered or increased by the attachment of the attachment bumper structure to the existing bumper.

According to another aspect of the invention, the existing bumper can have an existing length extending along an existing longitudinal axis of the existing bumper, and the length of the attachment bumper structure can be substantially the same as the existing length of the existing bumper.

According to another aspect of the invention, the inner portion of the attachment bumper structure can be formed to have an inner surface that corresponds with and mates with the front surface of the existing bumper.

According to another aspect of the invention, the attachment bumper structure can be a solid structure formed such that a frontal crash mode for the existing vehicle is not substantially changed by the addition of the attachment bumper structure to the existing bumper.

According to another aspect of the invention, a method for modifying an existing vehicle bumper can include providing an existing vehicle bumper that has an existing contact area defined by an outermost portion of an outer front surface of the existing vehicle bumper that would initially come into contact with a pedestrian during an accident, providing an attachment bumper structure having a length extending along a longitudinal axis of the attachment bumper structure, a height extending substantially normal to the length and between a top portion of the attachment bumper structure and a bottom portion of the attachment bumper structure, a depth extending substantially normal to both the length and the height and between an inner surface of the attachment bumper structure and an outer surface of the attachment bumper structure, and an attachment bumper contact area defined by an outermost portion of the outer surface of the attachment bumper structure that would initially come into contact with a pedestrian during an accident. The method can also include attaching the attachment bumper structure to the existing vehicle bumper such that the attachment bumper contact area is one of larger and lower than the existing contact area when the attachment bumper structure is attached to the existing vehicle bumper, and locating a portion of the attachment bumper structure in front of the outer front surface of the existing vehicle bumper such that forces exerted against the attachment bumper structure during an accident are transferred to the outer front surface of the existing bumper.

According to another aspect of the invention, the existing vehicle bumper can have an existing length extending along an existing longitudinal axis of the existing vehicle bumper, an existing height extending substantially normal to the existing length and between an existing top portion of the existing vehicle bumper and an existing bottom portion of the existing vehicle bumper, and an existing depth extending substantially normal to both the existing length and the existing height and between an existing inner surface of the existing vehicle bumper and an existing outer surface of the existing vehicle bumper. The method of attaching the attachment bumper structure can include locating the attachment bumper such that the existing length and the attachment bumper length overlap and are substantially the same.

According to another aspect of the invention, attaching the attachment bumper does not substantially change a frontal crash mode for the existing vehicle bumper.

According to another aspect of the invention, the method can include providing the attachment bumper structure with an attachment bracket, wherein the existing vehicle bumper is attached to a vehicle frame, and attaching the attachment bumper structure can include attaching the attachment bracket to one of the vehicle frame and the existing vehicle bumper.

According to another aspect of the invention, locating the attachment bumper structure can include providing the attachment bumper structure with an inner surface that corresponds to and mates with the outer front surface of the existing vehicle bumper.

According to another aspect of the invention, attaching the attachment bumper structure can include attaching a portion of the inner surface of the attachment bumper structure to the outer front surface of the existing vehicle bumper.

Still other aspects, features and attendant advantages of the invention will become apparent to those skilled in the art from a reading of the following detailed description of embodiments constructed in accordance therewith, and taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1A:
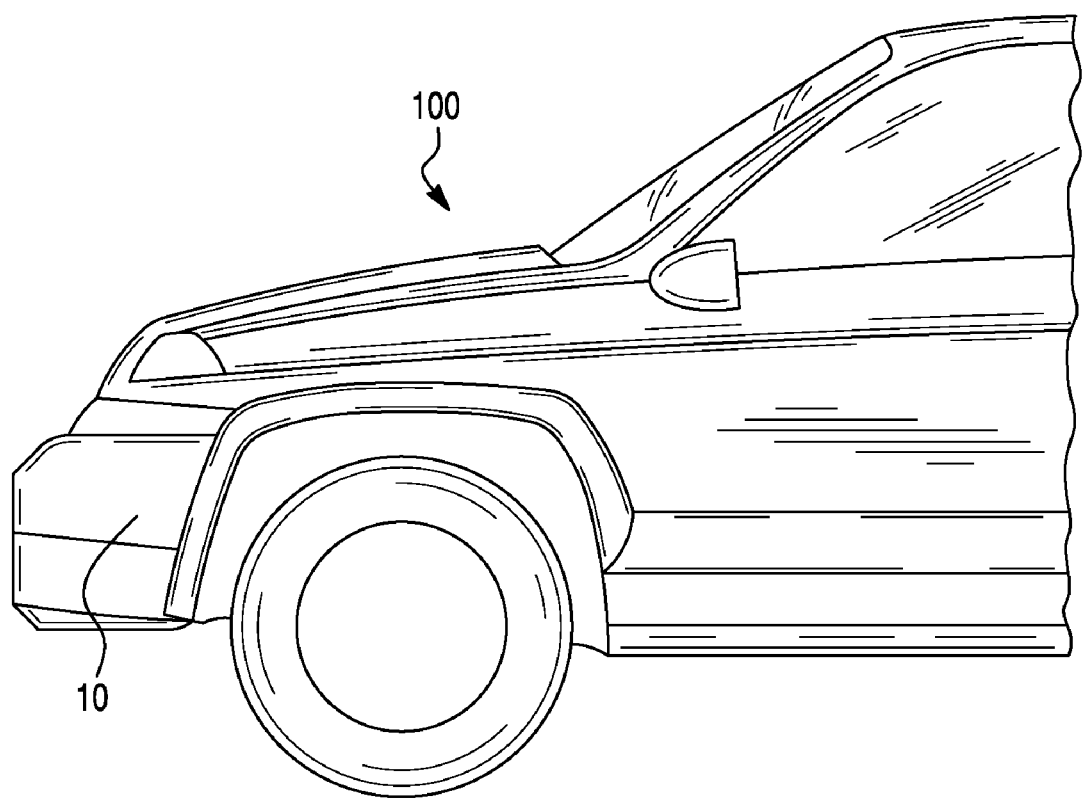
FIGS. 1a-1b are a side view of an embodiment of a vehicle bumper system made in accordance with principles of the invention as attached to an existing vehicle, and a side cross-sectional view of a vehicle bumper system made in accordance with principles of the invention as attached to an existing vehicle.

Referring to the drawing figures, like reference numerals designate identical or corresponding elements throughout the several figures.

Figure 1B:
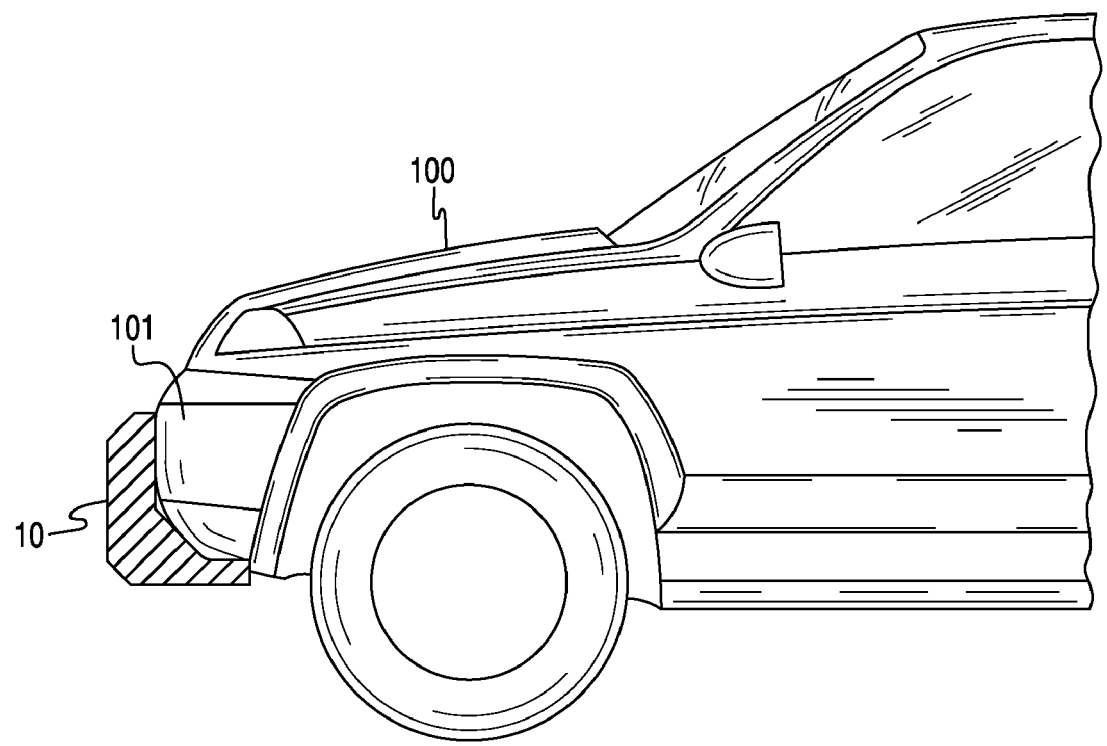

FIG. 1a is a side view of an embodiment of a vehicle bumper system 10 made in accordance with principles of the invention as attached to an existing vehicle 100. FIG. 1b is a side cross-sectional view of the vehicle bumper system 10 of FIG. 1a as attached to the existing vehicle 100. The vehicle bumper system 10 can be designed to aesthetically blend and mate with the existing vehicle bumper 101.

Figure 2:
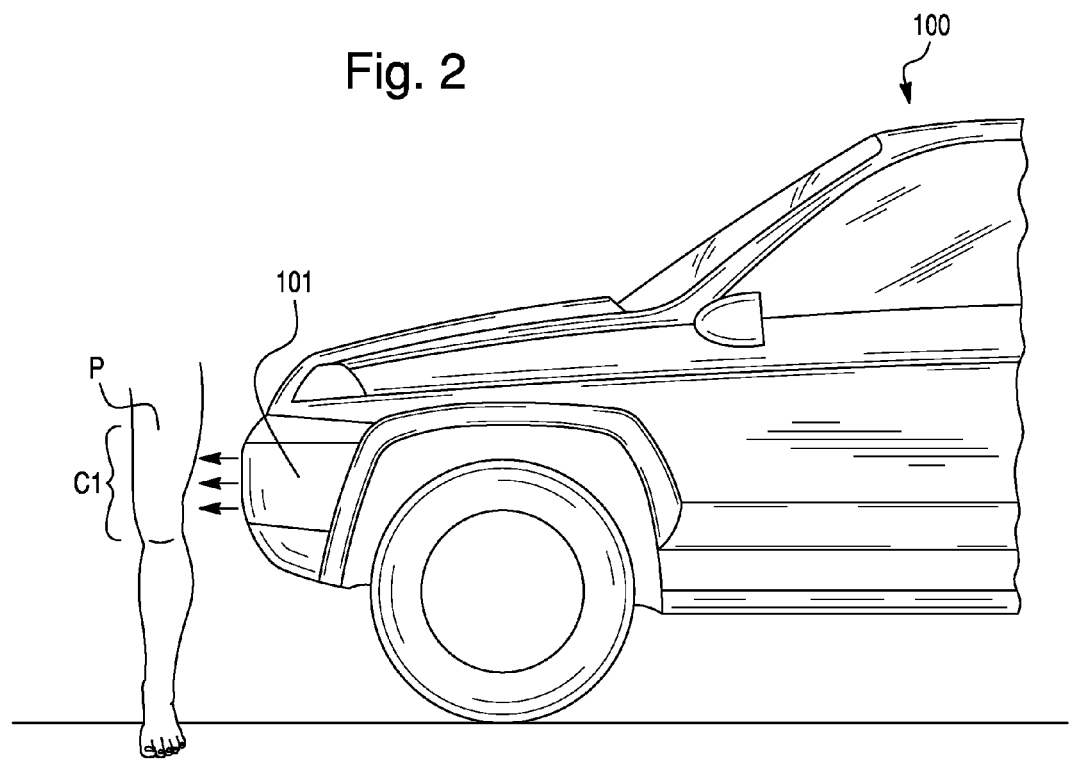
FIG. 2 is a side view showing possible adult pedestrian impact area for the existing vehicle shown in FIG. 1a without the vehicle bumper system attached.

FIG. 2 is a side view showing a contact area C1 between a leg of an adult pedestrian P and a vehicle 100 that does not include a vehicle bumper system 10. As can be seen in this figure, the contact area C1 is located primarily at and above the knee of the pedestrian P (the pedestrian being of average human height and stature). The location C1 at which the vehicle contacts the pedestrian P causes the majority of force during contact to be applied above the knee joint. This contact mode results in a large moment arm created above the knee during contact between the vehicle 100 and pedestrian P. The large moment can result in damage to the knee joint and/or cause the pedestrian P to be rolled or thrown underneath the vehicle 100 during contact.

It is commonly believed that the preferred mode of pedestrian vs. vehicle accidents is for the pedestrian to remain above the vehicle during the accident. It is often desirable to prevent the pedestrian from being thrown under the vehicle during an accident.

Figure 3:
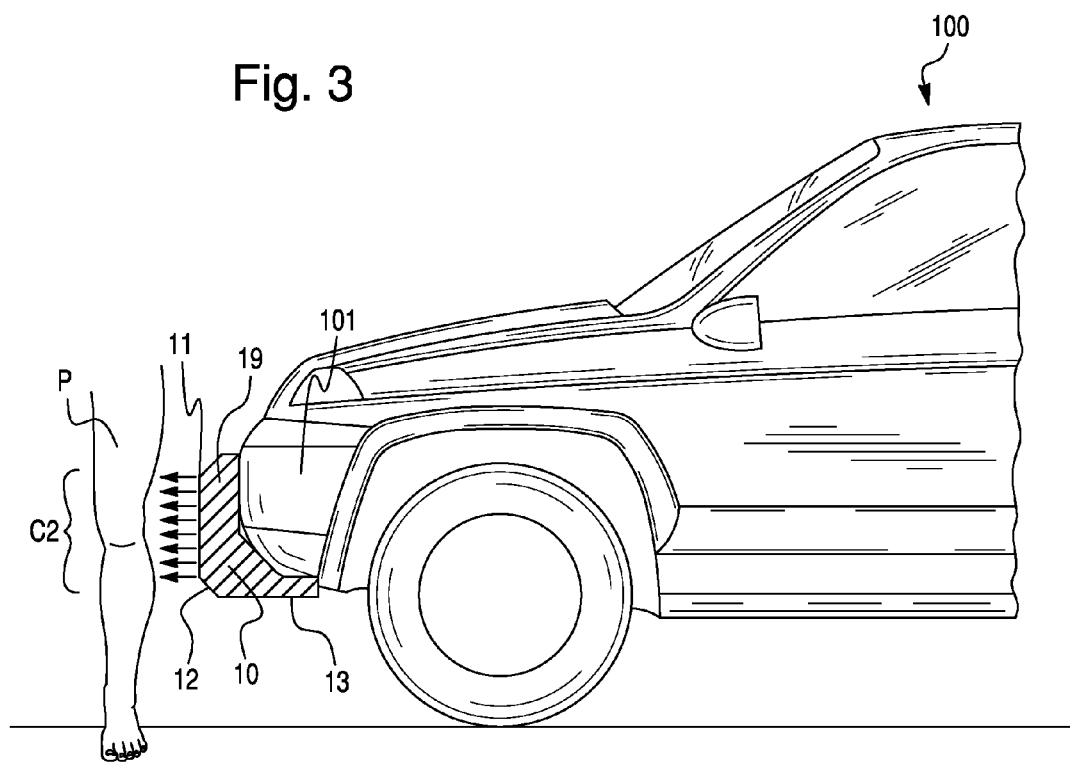
FIG. 3 is a side view of possible adult pedestrian impact area for the existing vehicle shown in FIG. 1a with the vehicle bumper system attached.

As shown in FIG. 3, when a vehicle bumper system 10 is attached to the existing vehicle bumper 101, the contact area C2 on the pedestrian P can be shifted downwards and/or enlarged, and can include a substantial portion located below the knee of the pedestrian P. Thus, the area of force that occurs during a pedestrian vs. vehicle accident can be located below the knee joint, which reduces the moment arm above the knee. When the majority of force during an accident is applied below the knee, the pedestrian tends to rollover the hood of the vehicle during the accident, which is preferable to being wedged or thrown underneath the vehicle. Thus, the vehicle bumper system 10 can prevent injury to the pedestrian P during contact with vehicle 100.

The vehicle bumper system 10 can include an attachment bumper 19 that has a front top edge 11, a front bottom edge 12, and a lower extension 13. The front surface of the attachment bumper 19 can be bounded by the top edge 11 and bottom edge 12 so as to define the potential contact area C2 between the vehicle bumper and the pedestrian P.

Figure 4:
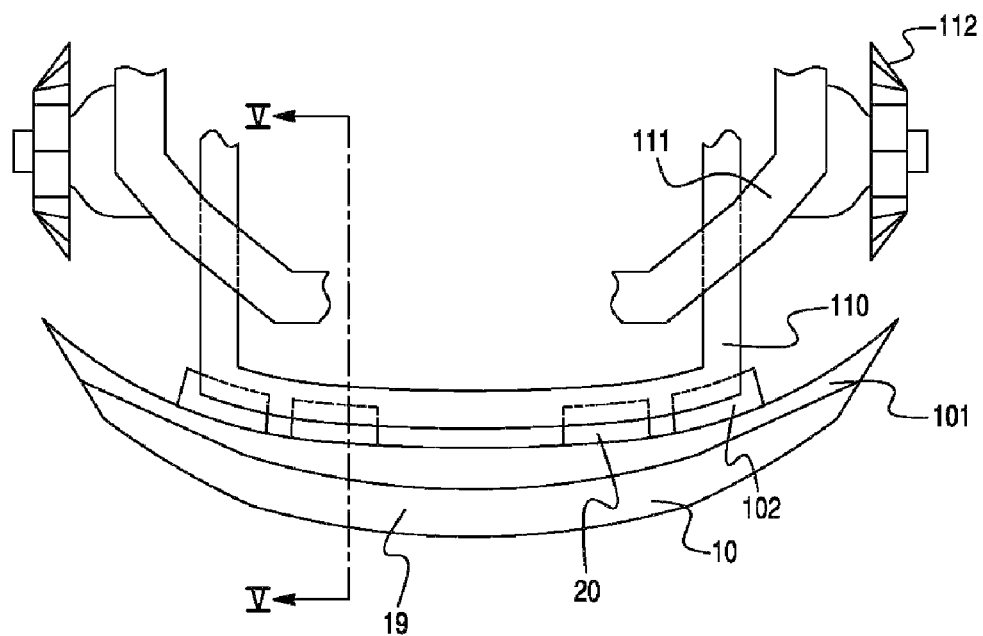
FIG. 4 is a top view of the vehicle bumper system of FIG. 1a as attached to the existing vehicle and vehicle frame.
Figure 5:
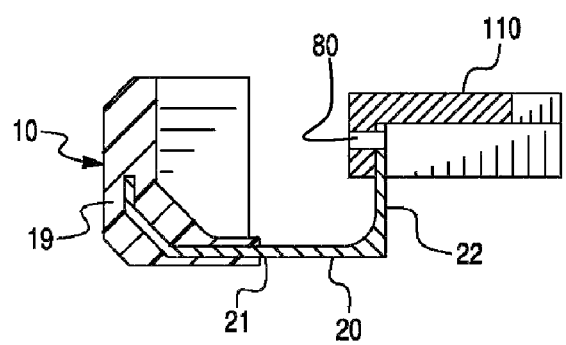
FIG. 5 is a cross-sectional view taken along line V-V of FIG. 4.

FIG. 4 is a top view of the vehicle bumper system 10 as it is attached to the existing vehicle 100 and vehicle frame 111. FIG. 5 is a cross-sectional view taken along line V-V of FIG. 4. The existing vehicle bumper 101 is commonly attached to a bumper frame rail 110 by an existing vehicle bumper bracket 102. The existing vehicle bumper frame rail 110 usually extends from a front portion of the vehicle frame 111 and in front of the vehicle wheels 112. Thus, the bumper frame rail 110 allows the existing vehicle bumper 101 to be attached to the front of the vehicle in an aesthetic manner with little or no connection members visible from the exterior of the vehicle 100.

The vehicle bumper system 10 can include a bumper bracket 20 that extends from the lower extension 13 of the attachment bumper 19 for attachment to the vehicle bumper frame rail 110. The attachment bumper 19 can also be formed such that it closely conforms to the existing vehicle bumper 101 when attached. This can be done for the purpose of aesthetics as well as to ensure that the crash characteristics remain substantially the same for the vehicle 100 when the attachment bumper 19 is attached as compared to when it is not attached. Because crash characteristics are not necessarily changed when a vehicle bumper system 10 is attached to a vehicle, a vehicle can be easily retrofitted with the vehicle bumper system for particular markets that require different bumper standards, and for different consumers that prefer different bumper safety or aesthetic features. Additional frontal crash mode testing may not be necessary.

The bumper bracket 20 can include a lower extension 21 that extends from the lower extension 13 of the attachment bumper 19, and which then turns upward to form an upward extension 22. An aperture 23 can be located in the upward extension 22 such that an attachment structure 80, such as a bolt, can pass there through and be connected to the existing vehicle frame rail 110.

Figure 6:
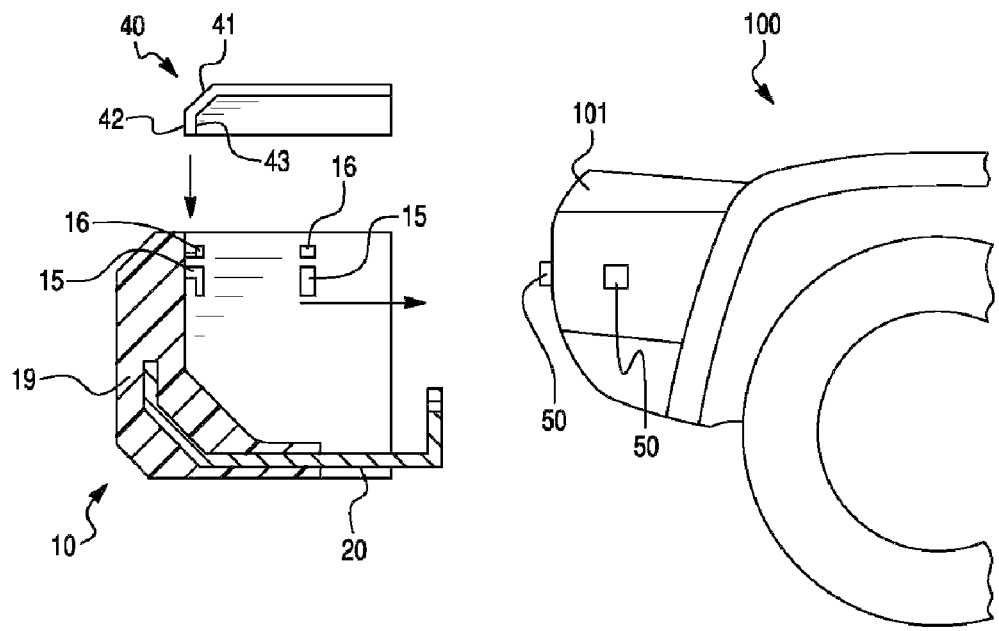
FIG. 6 is a cross-sectional view of another embodiment of a vehicle bumper system made in accordance with the principles of the invention.

FIG. 6 is a cross-sectional view of another embodiment of a vehicle bumper system made in accordance with the principles of the invention. As shown in FIG. 6, the vehicle bumper system 10 can include a plurality of attachment portions 50 that can be mounted on the existing vehicle bumper 101. Mating attachment portions 15 can be provided on an inner surface of the attachment bumper 19 for connection to the attachment portions 50. Various types of attachment mechanisms can be employed for the attachment portions 50 and mating attachment portions 15, such as tongue and clip attachment structures, adhesive pads, rivets, buttons, clasps, etc. The use of attachment portions 50 and mating attachment portions 15 provides a firmer attachment between the vehicle bumper system 10 and the existing vehicle bumper 101, if desired.

A bumper top attachment 40 can be provided for attachment to a top portion of the attachment bumper 19. The bumper top attachment 40 can be made from a pliable material such that it forms a seal between the attachment bumper 19 and the existing vehicle bumper 101. In addition, a flexible seal portion 41 can extend from a top of the bumper top attachment 40 such that it consistently contacts the existing vehicle bumper 101 along its entire length. The bumper top attachment 40 can include an insert portion 42 that extends downward and can fit within a lock clip 16 located on the attachment bumper 19. Lock portions 43 can be located along the insert portion 42 for locking the bumper top attachment 40 to the lock clips 16 of the attachment bumper 19.

Figure 7:
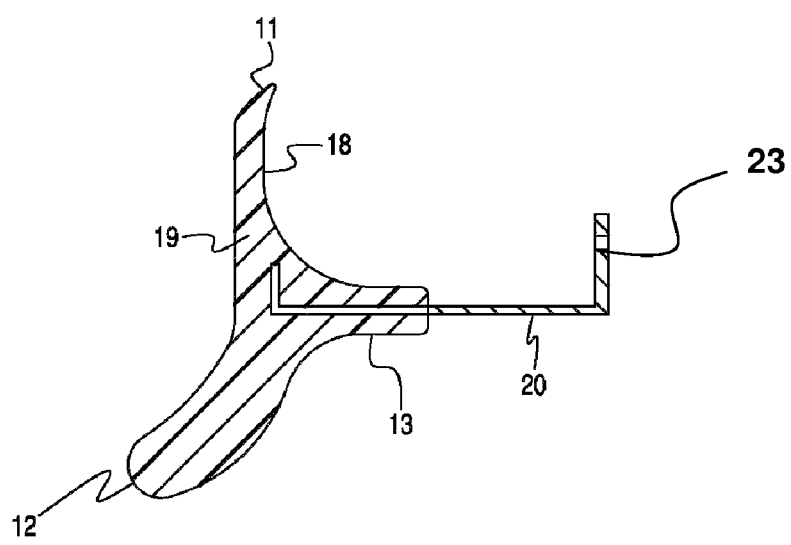
FIG. 7 shows a cross sectional view of another embodiment of a vehicle bumper system made in accordance with the principles of the invention.

FIG. 7 shows a cross sectional view of another embodiment of a vehicle bumper system 10 made in accordance with the principles of the invention. In this embodiment, the attachment bumper 19 can include a rear surface 18 that substantially corresponds and conforms to an existing vehicle bumper 101. The bottom edge 12 of the attachment bumper 19 can extend frontward and outward (down and away from the existing vehicle bumper 101) to form a type of spoiler appearance. The contact mode with a pedestrian in this case can be more localized at front lower edge 12 of the attachment bumper 19, and will be substantially below the knee of the pedestrian P to ensure increased safety during a vehicle vs. pedestrian accident.

Figure 8:
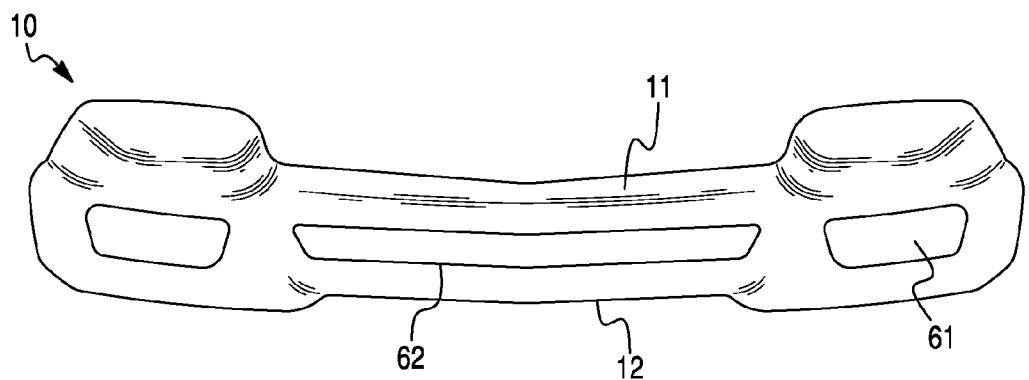
FIG. 8 shows a front view of another embodiment of a vehicle bumper system made in accordance with the principles of the invention.

FIG. 8 shows yet another embodiment of a vehicle bumper system 10 as viewed from the front. In this embodiment, openings 61 and 62 can be provided in the front face of the vehicle bumper system 10 to allow access to different vehicle accessories, such as running lamps, fog lamps, headlights, signal lights, air intake ports, security system controls, etc.

Figure 9:
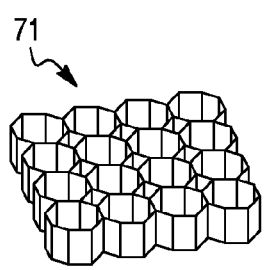
FIG. 9 shows an exemplary structure for portions of a vehicle bumper system made in accordance with the principles of the invention.
Figure 10:
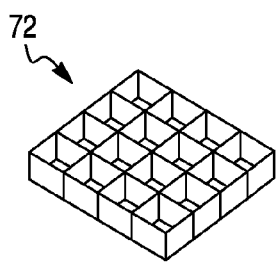
FIG. 10 shows an exemplary structure for portions of a vehicle bumper system made in accordance with the principles of the invention.

FIGS. 9 and 10 show exemplary materials/structures from which portions of the vehicle bumper system can be manufactured. The particular structures and materials provide various energy absorption characteristics. For example, a honeycomb structure 71 or a waffle structure 72 can be used to form the vehicle bumper system 10 in accordance with desired energy absorption characteristics. The honeycomb structure 71 and the waffle structure 72 can be made of many different types of materials, including plastic, aluminium, etc. Alternatively, FIG. 11 shows a foam material 73 that can be used to form a portion or portions of the vehicle bumper system 10.

Figure 11:
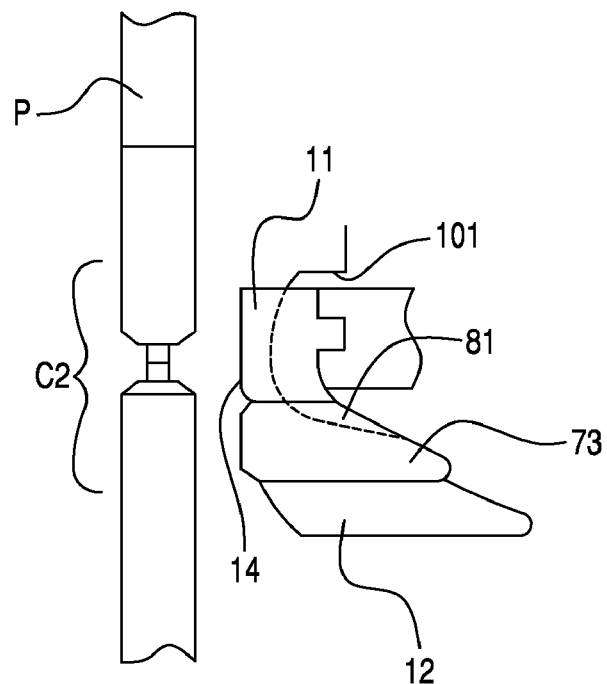
FIG. 11 shows a cross sectional view taken along line XI-XI of FIG. 12.
Figure 12:
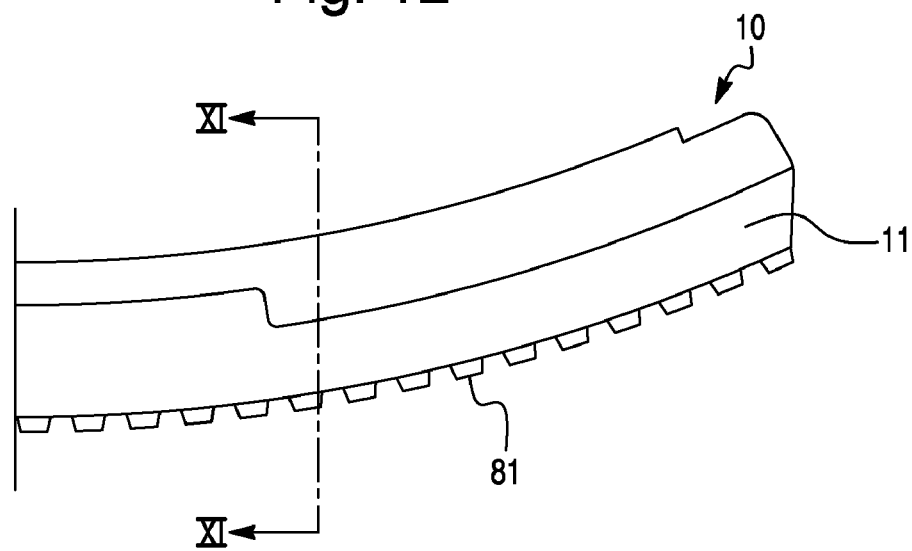
FIG. 12 shows a top view of another embodiment of a vehicle bumper system made in accordance with the principles of the invention.

FIGS. 11 and 12 show another embodiment of the vehicle bumper system 10 in which an absorber, such as absorbers 81, can be attached to and further comprise the vehicle bumper system 10. The absorbers 81 can be located within openings in the vehicle bumper system, such as openings 61 and 62 of the embodiment of FIG. 8, or can be located in a separation between top and bottom portions of a bumper system. The absorber or absorbers 81 can also be adhered or otherwise attached to a front surface of the bumper system 10. In operation, the absorbers 81 can provide a more even contact area C2 against a pedestrian P, depending on the geometry and materials selected for other portions of the vehicle bumper system 10. In the embodiment shown in FIG. 11, the absorbers 81 can be located between a top portion 11 and bottom portion 12 of the bumper system 10, and can be constructed of, for example, a foam material 73. Of course, other portions of the vehicle bumper system 10 can also be made of foam or other different materials as described above. The absorbers 81 can extend a predetermined distance from the vehicle bumper 101 along a frontward driving axis. For example, the absorber 81 can form a front face 14 of the vehicle bumper system 10 that is offset from the vehicle bumper 101 by about 77 mm, and can extend the front face 14 downwards by about 97 mm.

The vehicle bumper system 10 has several unique advantages, characteristics and features. For example, the vehicle bumper system 10 can permit a vehicle manufacturer to manufacture a basic design vehicle for a particular market while offering a vehicle bumper system 10 in the form of an add-on part for different markets that is easily installed and which does not substantially alter the frontal crash mode of the vehicle. If the vehicle bumper system 10 does not substantially change the frontal crash mode of the vehicle 100, then additional testing, development and certifications, etc. are not required for a vehicle that is modified with the vehicle bumper system 10, saving a great deal in cost when modifying the vehicle for a different market. Thus, it may be easier and more cost-effective to modify vehicles for entry into smaller markets that have different vehicle bumper requirements.

In addition, the vehicle bumper system 10 can be offered to consumers in a particular market in case the consumer prefers the particular safety, aesthetic or performance characteristic offered by a particular vehicle bumper system 10. For example, if a consumer uses a vehicle primarily for inner city delivery routes, a particular bumper deign and pedestrian contact configuration may be desired for that vehicle application. Thus, a particular vehicle bumper system 10 can be configured for such an application, and could then can be purchased and installed by the consumer.

The particular deign for a vehicle bumper system 10 can change the way in which the vehicle 100 contacts a pedestrian such that safety is increased for that particular market segment (e.g., high speed market, low speed market, dirt road market, etc.). Thus, as indicated above, a consumer can purchase a vehicle bumper system 10 that is particularly designed for the application of a vehicle.

While certain embodiments of the invention are described above, it should be understood that the invention can be embodied and configured in many different ways without departing from the spirit and scope of the invention. For example, the attachment bumper 19 can be configured in several different shapes, sizes, architectures, and materials. In particular, the attachment bumper 19 can be made from plastics, polymers, resins, ceramics, metals and other known materials. In addition, the architecture of the attachment bumper can be solid, as shown in FIG. 1b, but can also be formed as a hollow shell that includes an open space or other foam type material located within the hollow shell. The particular shape of the attachment bumper 19 can vary in accordance with the specific application of the vehicle bumper system 10 and the specific aesthetic, design, and performance characteristics that are desirable.

The bumper bracket 20 can also be made from many different materials and shaped in many various ways in order to make connection to a particular vehicle's bumper frame rail or other attachment structure. In particular, the bumper bracket can be made from metal, polymer, plastic, resin or other known material. In addition, the bumper bracket 20 can be attached to the attachment bumper 19 by being molded into the attachment bumper 19 itself, but can also be attached by using fasteners, adhesives, welds, or by being integrally formed with the attachment bumper 19.

The bumper bracket 20 can be attached to the frame rail 110 by a nut/bolt fastener system, but can also be attached using many different structures and/or means for attachment. For example, clip type fasteners, adhesives, welds, magnets, rivets, or other attachment type structures and methods can be used to attach the bumper bracket 20 to the frame rail 110.

The bumper top attachment 40 can also be formed from many different materials and structured in many different ways. The bumper top attachment can include attachment inserts 42 for locking into the attachment bumper 19, but can also be attached via an adhesive, calk, separate fasteners or clips, or other attachment structures or methods. The bumper top attachment 40 can also be made from various materials, including plastics, resins, polymers, metals, rubbers, etc. The flexible seal portion 41 can be integrally formed with the top attachment 40 or can be a separate piece. The flexible seal portion 41 can also be made of various different materials, including rubbers, plastics, resins, polymers, ceramics, metals, films, etc.

It should be understood that no modification of the existing vehicle bumper 101 is necessary. The vehicle bumper system 10 can be connected directly to the vehicle frame rail 110. However, it is conceived that the vehicle bumper system 10 can also be attached to a location on the existing vehicle bumper 101 or other locations, such as to the vehicle frame 111, to a vehicle body portion, or other structure. It is also possible to use clips that are inserted between body parts and connect to the frame structure of the vehicle 100 in order to connect the vehicle bumper system 10 to the vehicle 100.

While the invention has been described in detail with reference to exemplary embodiments thereof, it will be apparent to one skilled in the art that various changes can be made, and equivalents employed, without departing from the scope of the invention.

What is claimed is:

1. A pedestrian vehicle bumper system for attaching to an existing vehicle, the existing vehicle including an existing bumper and an existing frame structure, comprising:

an attachment bumper structure having a length extending along a longitudinal axis of the attachment bumper structure, a height extending substantially normal to the length and between a top portion of the attachment bumper structure and a bottom portion of the attachment bumper structure, and a depth extending substantially normal to both the length and the height and between an inner portion of the attachment bumper structure and an outer portion of the attachment bumper structure; and attachment structure located adjacent the inner portion of the attachment bumper structure and configured to connect to at least one of the existing bumper and the existing frame structure of the existing vehicle, wherein, the attachment bumper structure is comprised of a material having sufficient rigidity such that a frontal crash mode of the vehicle is substantially the same when the attachment bumper structure is attached to the vehicle as compared to when the attachment bumper structure is not attached to the vehicle, the existing bumper has an existing length extending along an existing longitudinal axis of the existing bumper, and the length of the attachment bumper structure is substantially the same as the existing length of the existing bumper, and the existing bumper has an existing height that is normal to the existing length, and extends between an existing top portion and an existing bottom portion of the existing bumper, and the attachment bumper structure is located in front of the existing bumper and also extends a substantial distance from the existing bottom portion of the existing bumper when attached to the existing bumper such that a contact area for the bumper system relative to a pedestrian is lowered by the attachment of the attachment bumper structure to the existing bumper, wherein the attachment structure extends underneath the existing bumper such that the attachment bumper structure extends a substantial distance below the existing bottom portion of the existing bumper when attached to the existing bumper such that the contact area for the bumper system relative to the pedestrian is lowered.

2. The pedestrian vehicle bumper system of claim 1, wherein the attachment structure extends from the bottom portion of the attachment bumper structure and includes at least one of a bolt, a clip, a rivet, a weld, and an adhesive for attachment to at least one of the existing bumper and the existing frame structure.

3. The pedestrian vehicle bumper system of claim 1, wherein the bottom portion of the attachment bumper structure extends in an inward depthwise direction to mate with the existing bumper while also extending downward relative to the existing bumper.

4. The pedestrian vehicle bumper system of claim 1, wherein the bottom portion of the attachment bumper structure extends a first downward distance from the existing bumper that is substantially equal to 20% of the height of the existing bumper.

5. The pedestrian vehicle bumper system of claim 1, further comprising:
a bumper top attachment located adjacent the top portion of the attachment bumper structure such that it can contact the existing bumper.

6. The pedestrian vehicle bumper system of claim 5, wherein the bumper top attachment is formed of a material that is more flexible then the attachment bumper structure such that the bumper top attachment can contact and conform to the existing bumper.

7. The pedestrian vehicle bumper system of claim 1, wherein the attachment structure extends from the bottom portion of the attachment bumper structure and is directly attached to the existing frame structure of the existing vehicle.

8. The pedestrian vehicle bumper system of claim 1, wherein a first contact area is defined by an area between a top of the existing vehicle bumper and a bottom of the existing vehicle bumper, and a second contact area is defined by a second area between the top portion of the attachment bumper structure and the bottom portion of the attachment bumper structure, and the second contact area is located lower than the first contact area.

9. The pedestrian vehicle bumper system of claim 8, wherein the second contact area is larger than the first contact area.

10. The pedestrian vehicle bumper system of claim 1, wherein the existing bumper is made from a rigid material having a same rigidity as the rigid material of the attachment bumper structure such that the frontal crash mode of the vehicle is substantially the same when the attachment bumper structure is attached to the vehicle as compared to when the attachment bumper structure is not attached to the vehicle.

* * * * *